(12) United States Patent
Kim

(10) Patent No.: US 8,652,661 B2
(45) Date of Patent: Feb. 18, 2014

(54) SECONDARY BATTERY WITH PROTECTION CIRCUIT MODULE AND METHOD OF MANUFACTURING THE SAME

(75) Inventor: Bongyoung Kim, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 163 days.

(21) Appl. No.: 12/643,383

(22) Filed: Dec. 21, 2009

(65) Prior Publication Data

US 2010/0159291 A1  Jun. 24, 2010

(30) Foreign Application Priority Data

Dec. 23, 2008  (KR) .................. 10-2008-0132517

(51) Int. Cl.
*H01M 14/00* (2006.01)

(52) U.S. Cl.
USPC ............................................................ 429/7

(58) Field of Classification Search
USPC .............................................. 429/7; 228/44.7
See application file for complete search history.

(56) References Cited

U.S. PATENT DOCUMENTS

| 7,811,686 | B2 | 10/2010 | Seo et al. | |
|---|---|---|---|---|
| 2003/0108780 | A1 | 6/2003 | Iwaizono et al. | |
| 2005/0153172 | A1* | 7/2005 | Han | 429/7 |
| 2008/0226974 | A1 | 9/2008 | Jang et al. | |
| 2009/0092860 | A1* | 4/2009 | Yamamoto et al. | 429/7 |
| 2011/0045322 | A1* | 2/2011 | Baek et al. | 429/7 |

FOREIGN PATENT DOCUMENTS

| CN | 101267029 | | 9/2008 | |
|---|---|---|---|---|
| EP | 1 093 178 | A1 | 4/2001 | |
| EP | 1 760 804 | A1 | 3/2007 | |
| JP | 2006-066290 | | 3/2006 | |
| KR | 10-2005-0082424 | | 8/2005 | |
| KR | 1020070025392 | | 3/2007 | |
| KR | 100833745 | | 5/2008 | |
| WO | WO 2008050956 | A1 * | 5/2008 | ............. H01M 2/22 |

OTHER PUBLICATIONS

Notice of Allowance dated Feb. 17, 2011 for corresponding KR Patent Application No. 10-2008-0132517.
Partial European Search Report dated Sep. 8, 2010 for corresponding EP Application No. 09180593.7.
Office Action dated Feb. 24, 2012 in corresponding CN Application No. 200910262031.3.

\* cited by examiner

*Primary Examiner* — Ula C Ruddock
*Assistant Examiner* — Frank Chernow
(74) *Attorney, Agent, or Firm* — Knobbe, Martens, Olson & Bear, LLP

(57) ABSTRACT

A secondary battery with a protection circuit module and a manufacturing method thereof are disclosed. The secondary battery includes a bare cell, and a protection circuit board including a circuit board and a coupling member positioned at least one side in the longitudinal direction of the circuit board to couple the circuit board to the bare cell. The coupling member includes a coupler fixed to the circuit board, and first and second supports respectively extending from the coupler and spaced apart from each other in the longitudinal direction of the circuit board.

11 Claims, 5 Drawing Sheets

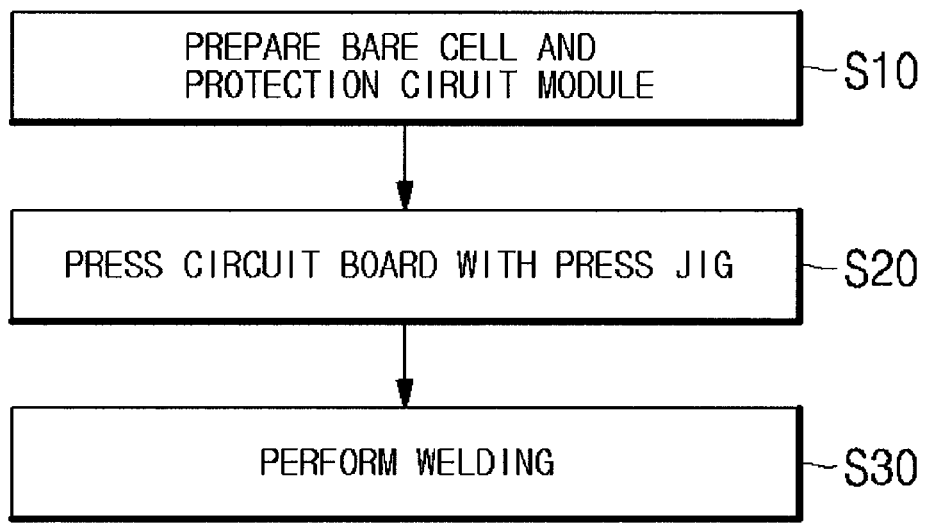
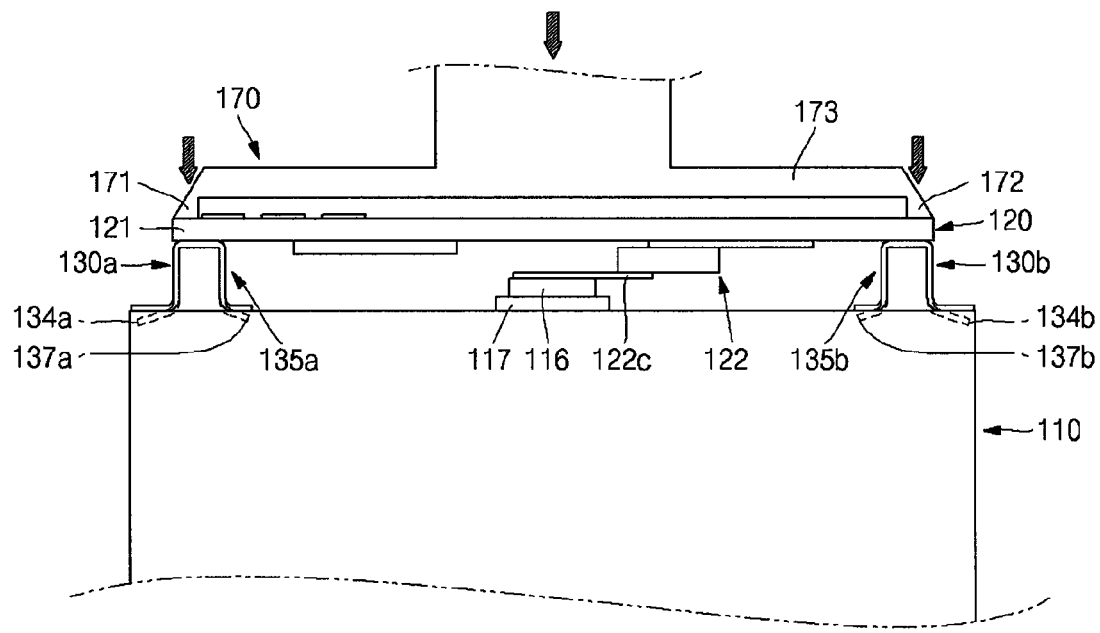

SECONDARY BATTERY WITH PROTECTION CIRCUIT MODULE AND METHOD OF MANUFACTURING THE SAME

CROSS-REFERENCE TO RELATED APPLICATION

This application claims the benefit of Korean Application No. 10-2008-0132517, filed on Dec. 23, 2008 in the Korean Intellectual Property Office, the disclosure of which is incorporated herein by reference.

BACKGROUND OF THE INVENTION

1. Field of the Invention

The present invention relates to a secondary battery and a method of manufacturing the same, and more particularly to, a secondary battery having a protection circuit module and a method of manufacturing the same.

2. Description of the Related Art

In recent years, due to rapid development of electronics, communication and computer industries, portable electronic devices are being widely used. Rechargeable secondary batteries are being mainly used as power sources of portable electronic devices.

Currently, pack type batteries are being widely used as secondary batteries. A pack type battery is a unit in which a bare cell providing electric energy and a protection circuit module (PCM) controlling charge and discharge of the bare cell are integrated into a single unit. The PCM includes a circuit board to which various circuit devices are mounted and is coupled to a bare cell. In a thin square type secondary battery, a longitudinal thin bar type circuit board is used. In this case, the circuit may be easily bent during the coupling to the bare cell. Thus, charge and discharge terminals provided on the circuit board may be relatively lowered.

BRIEF SUMMARY OF THE INVENTION

The present invention has been made in view of the above problems, and the present invention provides a secondary battery having a protection circuit module with a coupling member for restricting a circuit board from being bent during the coupling of the circuit board with a bare cell.

The present invention also provides a method of manufacturing a secondary battery having a protection circuit module for preventing a circuit board from being bent during the coupling of the circuit board with a bare cell.

In accordance with an aspect of the present invention, there is provided a secondary battery having a protection circuit module, the secondary battery comprising: a bare cell; and a protection circuit module including a circuit board and a coupling member positioned at least one side in the longitudinal direction of the circuit board to couple the circuit board to the bare cell; wherein the coupling member comprises: a coupler fixed to the circuit board; and first and second supports respectively extending from the coupler and spaced apart from each other in the longitudinal direction of the circuit board.

The coupling member may comprise two coupling members which are respectively provided at both sides in the longitudinal direction of the circuit board. The two coupling members may be positioned at both ends in the longitudinal direction of the circuit board. At least one of the two coupling members may be made of electrically conductive material.

The first support of the coupling member may further comprise a first contact contacting the bare cell and a first support leg connecting the coupler to the first contact; wherein the second support further comprises a second contact contacting the bare cell and a second support leg connecting the coupler to the second contact, the first contact is positioned outer in the longitudinal direction than the second contact.

The first contact of the first support of the coupling member may be coupled to the bare cell by welding. In this case, the welding may comprise laser welding.

The first contact may comprise a plate connected to the first support leg.

The second contact may comprise a plate connected to the second support leg.

The second contact may be formed at an end of the second support leg.

The coupling member may be integrally made by bending a plate member.

In accordance with another aspect of the present invention, there is provided a method of manufacturing a secondary battery including a protection circuit module, the method comprising: preparing a bare cell and a protection circuit module including a circuit board and coupling members positioned at both sides in the longitudinal direction of the circuit board; pressing the circuit board with a press jig for the close contact of the coupling members of the protection circuit module against the bare cell; and performing welding of the coupling members of the bare cell for the coupling of the protection circuit module to the bare cell, wherein, in the pressing of the circuit board, the press jig presses the both sides in the longitudinal direction of the circuit board except for the center of the circuit board.

In accordance with still another aspect of the present invention, there is provided a press jig for pressing a protection circuit module having a circuit board and coupling members positioned at both sides in the longitudinal direction of the circuit board for welding, the press jig comprising first and second pressing unit provided to correspond to positions of the coupling members of the protection circuit module.

Each of the coupling members may comprise: a coupler fixed to the circuit board; and first and second supports respectively extending from the coupler and spaced apart from each other in the longitudinal direction of the circuit board.

The first support of the coupling members may further comprise a first contact contacting the bare cell and a first support leg connecting the coupler to the first contact; wherein the second support further comprises a second contact contacting the bare cell and a second support leg connecting the coupler to the second contact, the first contact is positioned outer in the longitudinal direction than the second contact.

Each of the coupling members may be integrally made by bending a plate member.

The above-mentioned structures can accomplish all the above-mentioned aspects of the present invention. More particularly, since the coupling member provided in the PCM include two supports extending from the circuit board, the circuit board can be prevented from being bent during the coupling of the circuit board of the PCM with the bare cell.

Moreover, since the circuit board is prevented from being bent, the lowering of the charge and discharge terminals of the circuit board can be prevented.

BRIEF DESCRIPTION OF THE DRAWINGS

The features and advantages of the present invention will be more apparent from the following detailed description in conjunction with the accompanying drawings, in which:

FIG. 7 is a flowchart illustrating a manufacturing method for a secondary battery according to an embodiment of the present invention; and FIG. 8 is a view illustrating a process of pressing welding portions by a press jig.

DETAILED DESCRIPTION OF THE INVENTION

Hereinafter, exemplary embodiments of the present invention will be described in detail with reference to the accompanying drawings.

Figure 1:
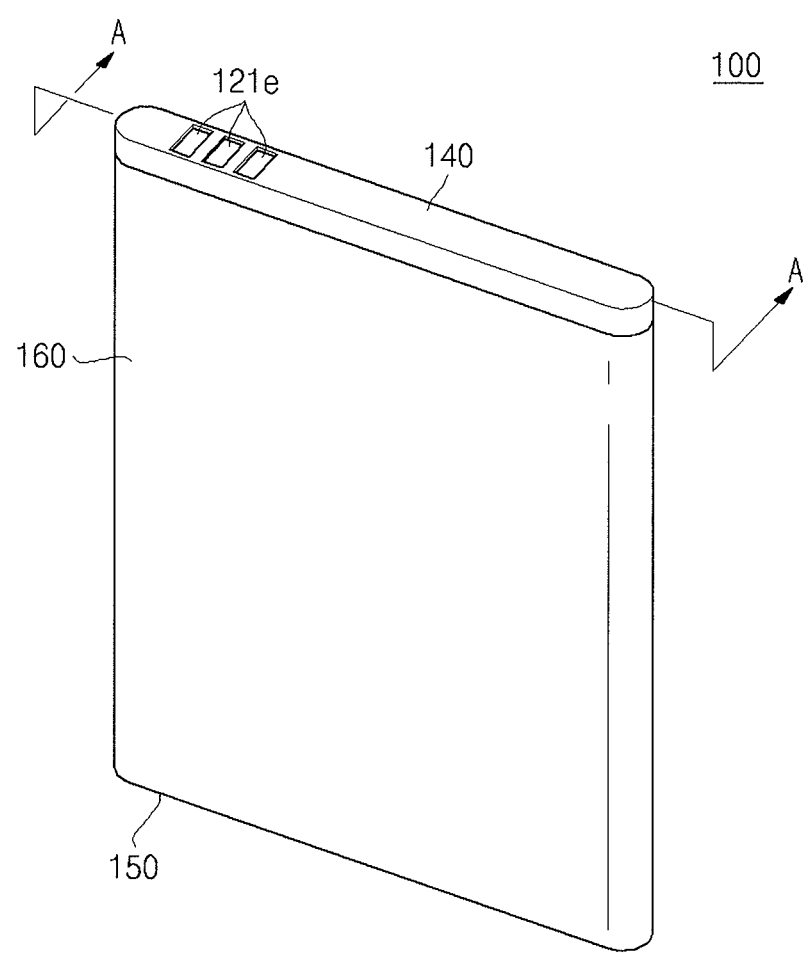
FIG. 1 is a perspective view of a secondary battery according to an embodiment of the present invention.
Figure 2:
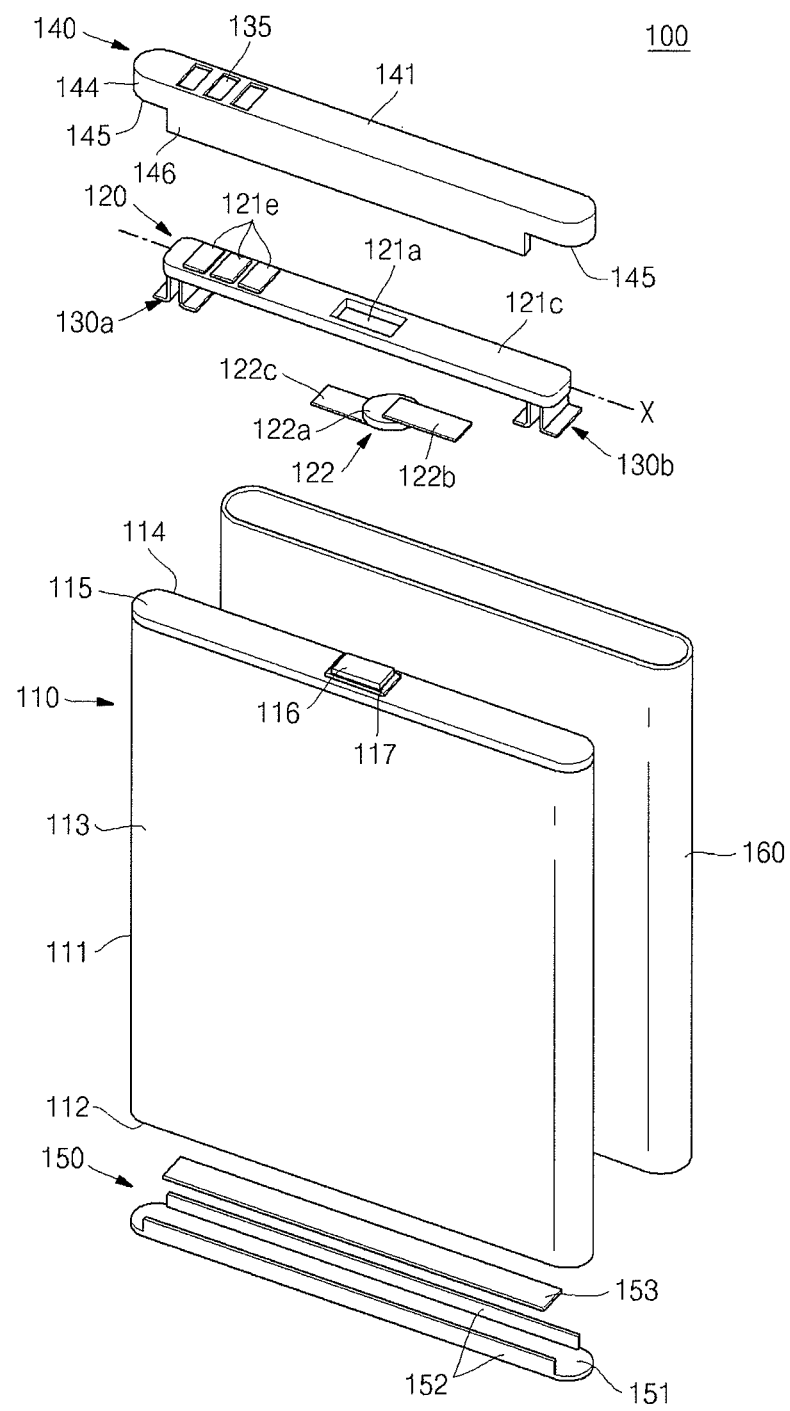
FIG. 2 is an exploded perspective view of the secondary battery of FIG. 1.
Figure 3:
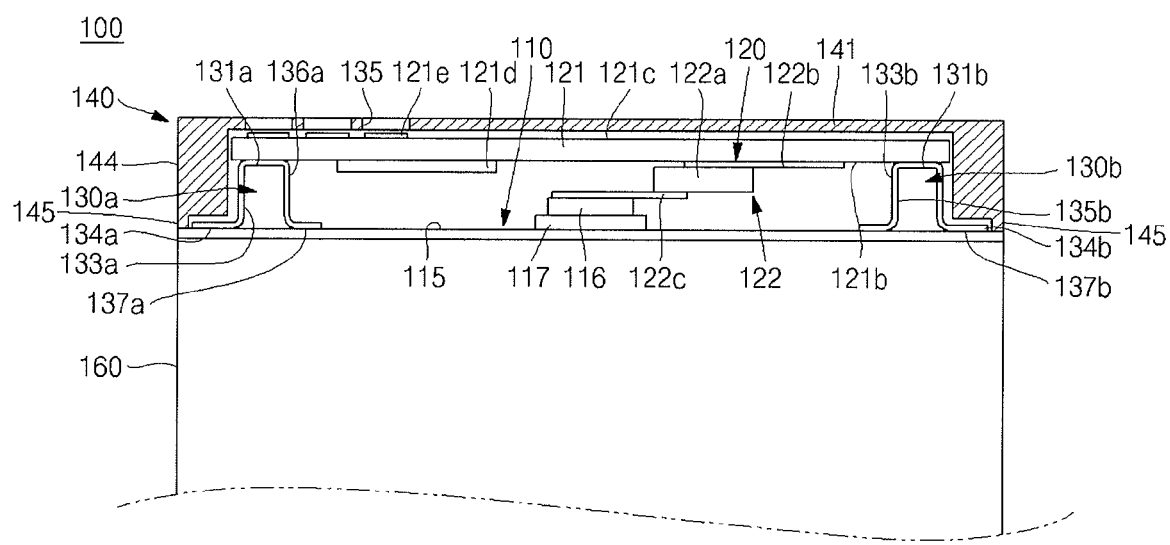
FIG. 3 is a sectional view taken along line A-A of FIG. 1 for illustrating the interior of the secondary battery of FIG. 1 by cutting off a top case.
Figure 4:
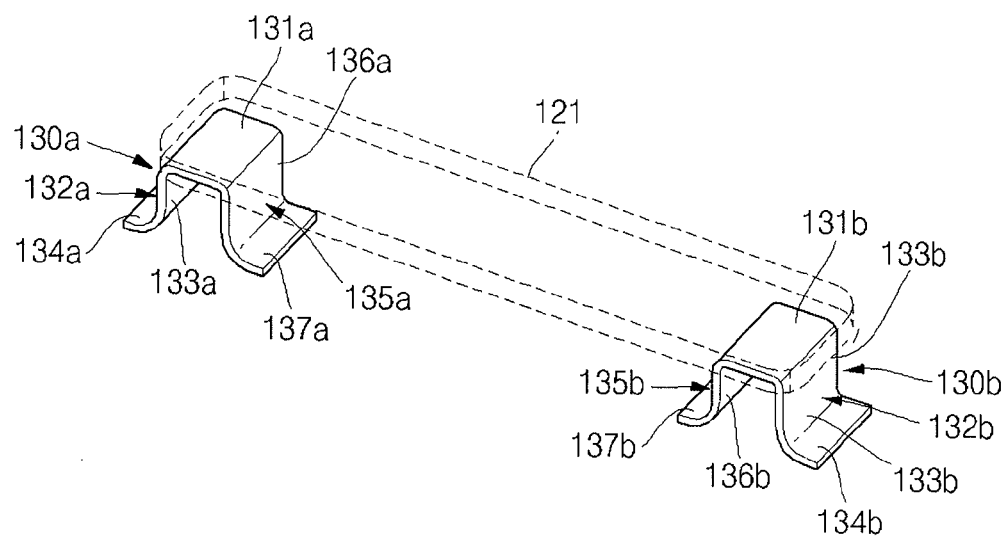
FIG. 4 is a perspective view illustrating a first coupling member and a second coupling member of FIG. 3.
Figure 5:
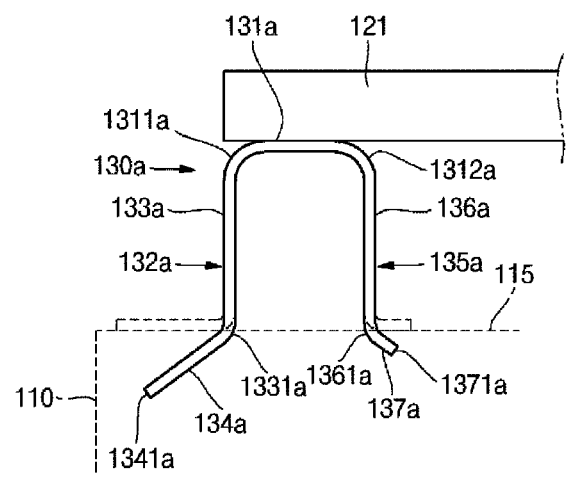
FIG. 5 is a side sectional view enlarging the first coupling member of FIG. 3.

FIG. 1 is a perspective view of a secondary battery according to an embodiment of the present invention. FIG. 2 is an exploded perspective view of the secondary battery of FIG. 1. FIG. 3 is a sectional view taken along line A-A of FIG. 1 for illustrating the interior of the secondary battery of FIG. 1 by cutting off a top case. FIG. 4 is a perspective view illustrating a first coupling member and a second coupling member of FIG. 3. FIG. 5 is a side sectional view enlarging the first coupling member of FIG. 3.

Referring to FIGS. 1 to 3, the secondary battery 100 includes a bare cell 110, a protection circuit module 120, a top case 140, a bottom case 150, and a label 160.

The bare cell 110 provides an electrical energy source, and includes an electrode assembly (not shown), a can 111 in which the electrode assembly is received through an opening (not shown) thereof, and a cap assembly 114 covering the opening of the can 111.

Although not illustrated, the electrode assembly is formed by winding a positive electrode plate, a negative electrode plate, and a separator interposed therebetween. A positive electrode tab and a negative electrode tab are coupled to the positive electrode plate and the negative electrode plate respectively. The can 111 is a metal container having a substantially parallelepiped shape and has an opening (not shown) at the top thereof. The can 111 includes a substantially rectangular bottom plate 112, and a side wall 113 extending from the periphery of the bottom plate 112. The can 111 provides a space in which the electrode assembly and an electrolyte are accommodated, and is electrically connected to the positive electrode tab to function as a positive electrode terminal. The can 111 is manufactured preferably by deep-drawing a metal such as aluminum or an aluminum alloy.

The cap assembly 114 includes a cap plate 115 and an electrode terminal 116. The cap plate 115 has a substantially rectangular shape, and closes the opening formed at the top of the can 111. The cap plate 115 is made of a conductive material such as aluminum or an aluminum alloy. The positive electrode tab of the electrode assembly is electrically connected to the cap plate 115, which functions as a positive electrode terminal. The electrode terminal 116 is located substantially at the center of the cap plate 115 and passes through the cap plate 115. An insulation gasket 117 surrounds the electrode terminal 116 to insulate the electrode terminal 116 from the cap plate 115. The negative electrode tab of the electrode assembly is electrically connected to the electrode terminal 116, which functions as a negative electrode terminal. Although the cap plate 115 functions as the positive electrode terminal and the electrode terminal 116 functions as the negative electrode terminal in the embodiment of the present invention, the present invention is not limited thereto. It is apparent to those skilled in the art that the cap plate 115 may function as the negative electrode terminal and the electrode terminal 116 may function as the positive electrode terminal according to connection to the positive electrode tab and the negative electrode tab of the electrode assembly.

The protection circuit module 120 includes a circuit board 121, a first coupling member 130a, and a second coupling member 130b. The protection circuit module 120 is coupled to the bare cell 110 and controls the operation of the secondary battery 100 including charge and discharge of the secondary battery.

The circuit board 121 is a printed circuit board in which wire patterns are printed, and is a substantially rectangular thin bar extending long along an extension axis X, and a through-hole 121a is formed at the center of the circuit board 121. A welding rod for resistance welding or a laser beam for laser welding passes through the through-hole 121a. The circuit board 121 has a first surface 121b and a second surface 121c opposite to the first surface 121b. The first coupling member 130a and the second coupling member 130b are coupled to opposite ends of the first surface 121b of the circuit board 121. The first surface 121b faces the cap plate 115 of the bare cell 110 and is spaced apart from the cap plate 115. An electric circuit device 121d is mounted to the first surface 121b of the circuit board 121. The electric circuit device 121d includes a control IC, a charge/discharge switch, etc. A positive temperature coefficient (PTC) device 122 is mounted to the first surface 121b of the circuit board 121.

The PTC device 122 includes a PTC body 122a, a first lead plate 122b, and a second lead plate 122c. The first lead plate 122b is electrically connected to one surface of the PTC body 122a, and the second lead plate 122c is electrically connected to the opposite surface of the PTC body 122a. The PTC body 122a is located on the cap plate 115 of the bare cell 110, and detects heat generated in the bare cell 110 to be operated thereby. The resistance of the PTC body 122a rapidly increases if the temperature thereof exceeds a predetermined value. Hence, when the temperature of the bare cell 110 exceeds a predetermined value, the PTC body 122a protects the secondary battery 100 by interrupting the flow of current or rapidly reducing the current. The first lead plate 122b is made of a conductive material such as nickel and is electrically connected to the circuit board 121. The second lead plate 122c is made of a conductive material such as nickel and is electrically connected to the electrode terminal 116 of the bare cell 110, for example, by resistance welding. Then, a welding rod (not shown) can enter a space between the circuit board 121 and the cap plate 115 of the bare cell 110 through the through-hole 121a formed in the circuit board 121.

An external terminal 121e electrically connected to an external load or a charger is provided on the second surface 121c of the circuit board 121.

Referring to FIGS. 2 to 5, the first coupling member 130a and the second coupling member 130b are located on opposite sides along the lengthwise direction (X-axis) of the circuit board 121. The first coupling member 130a and the second coupling member 130b are made of a conductive material to couple the circuit board 121 of the protection circuit module 120 to the bare cell 110, and at the same time, functions as an electrode tab electrically connecting the circuit board 121 to the bare cell 110. Meanwhile, one of the coupling members 130a and 130b may be made of a non-conductive material. In this case, the coupling member made of a non-conductive material only supports the circuit board.

The first coupling member 130a is formed by bending a plate member made of a conductive material such as nickel. The first coupling member 130a includes a coupler 131a, a first support 132a, and a second support 135a.

The coupler 131a is a substantially rectangular flat plate, and is attached and electrically connected to one end of the first surface 121b of the circuit board 121.

The first support 132a includes a first support leg 133a and a first contact 134a. The first support leg 133a extends from one end 1311a of the coupler 131a located on the lengthwise outer side of the circuit board 121 toward the cap plate 115 of the bare cell 110. The first support leg 133a is a substantially flat plate and is bent from the coupler 131a toward the bare cell. The first contact 134a is a substantially flat plate and is bent from the first support leg 133a toward the opposite side of the coupler 131a. Before the protection circuit module 120 is coupled to the bare cell 110, as illustrated in FIG. 5, the first contact 134a is inclined downward such that one end 1341a of the first contact 134a is located further away from the circuit board 121 than an end 1331a of the first support leg 133a. Under the above-mentioned shape, the circuit board 121 is pressed by a press jig, and when the first contact 134a makes contact with the cap plate 115 of the bare cell 110, it is bent such that its entire surface is attached as illustrated by a dotted line. The first contact 134a is coupled to the cap plate 115 of the bare cell 110, for example, by laser welding.

The second support 135a includes a second support leg 136a and a second contact 137a. The second support leg 136a extends one end 1312a of the coupler 136a located on the lengthwise inner side of the circuit board 121 toward the cap plate 115 of the bare cell 110. The second support leg 136a is a substantially flat plate and is bent from the coupler 131a. The second contact 137a is a substantially flat plate and is bent from the second support leg 136a toward the opposite side of the coupler 131a. Before the protection circuit module 120 is coupled to the bare cell 110, as illustrated in FIG. 5, the second contact 137a is inclined downward such that one end 1371a of the second contact 137a is located further away from the circuit board 121 than an end 1361a of the second support leg 136a. Under the above-mentioned shape, the circuit board 121 is pressed by a press jig, and when the second contact 137a makes contact with the cap plate 115 of the bare cell 110, it is deformed such that its entire surface is attached as illustrated by a dotted line. Since the second support 135a is located on the lengthwise inner side of the circuit board 121 than the first support 132a, the circuit board 121 is effectively prevented from bent due to a bending moment applied to the circuit board 121. Therefore, a reduced depth of the external terminal 121e formed on the second surface 121c of the circuit board 121 due to deflection of the circuit board 121 can be prevented.

The second coupling member 130b includes a coupler 131b, a first support 132b having a first support leg 133b and a first contact 134b, and a second support 135b having a second support leg 136b and a second contact 137b. The structure and operation of the second coupling member 130b is the same as those of the first coupling member 130a, in which case a detailed description thereof will not be repeated.

The top case 140 is accommodated inside the protection circuit module 120 to protect the protection circuit module 120. The top case 140 includes a cover plate 141 and a side wall 144 extending downward from the cover plate 141.

The cover plate 141 has substantially the same shape as that of the cap plate 115 of the bare cell 110. One or more through-holes 135 are formed in the cover plate 141. An external terminal 121e of the protection circuit module 120 is exposed to the outside through the through-hole 135. The inner surface of the cover plate 141 faces and makes contact with the second surface 121c of the circuit board 121 of the protection circuit module 120.

An end 145 of the side wall 144 makes contact with the cap plate 115 of the bare cell 110 and supports the top plate 130. An extension 146 is formed by extending the outer peripheral portion of the end 145 of the side wall 144. The extension 146 covers the top of the side wall 113 of the can 111 of the bare cell 110.

The bottom case 150 includes a bottom plate 151 and two extensions 152 extending upward from the bottom plate 151. The bottom plate 151 has substantially the same shape of that of the bottom plate 112 of the bare cell 110, and is attached to the bottom plate 112 of the bare cell by a bonding member 153. The two extensions 152 cover the bottom of the side wall 113 of the can 111 of the bare cell 110.

The label 160 is attached to the side surface 130 of the bare cell 110, surrounding it. The label 160 covers the extension 146 formed in the top case 140 and the extensions 152 of the bottom case 150.

Hereinafter, a coupling member of a protection circuit module according to another embodiment of the present invention will be described in detail.

Figure 6:
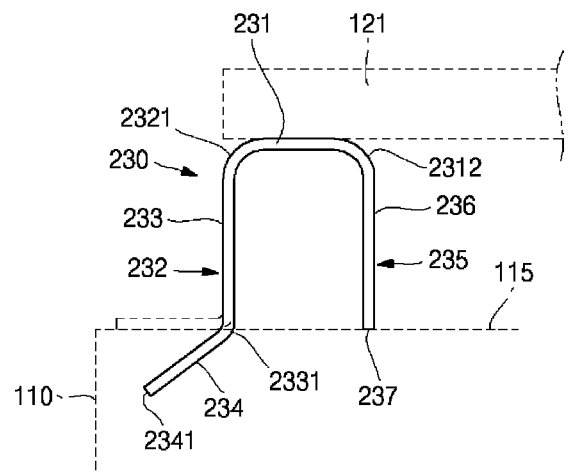
FIG. 6 is a side sectional view illustrating another embodiment of the first coupling member of FIG. 5.

FIG. 6 illustrates a coupling member of a protection circuit module according to another embodiment of the present invention. Referring to FIG. 6, the coupling member 230 is formed by bending a plate member made of a conductive material such as nickel. The coupling member 230 includes a coupler 231, a first support 232, and a second support 235.

The coupler 230 is a substantially rectangular flat plate, and is attached to and electrically connected to one end of a first surface 121b of a circuit board 121.

The first support 232 includes a first support leg 233 and a first contact 234. The first support leg 233 extends from one end 2311 of the coupler 231 located on the lengthwise outer side of the circuit board 121 toward the cap plate 115 of the bare cell 110. The first support leg 233 is a substantially flat plate and is bent from the coupler 131a. The first contact 234 is a substantially flat plate and is bent from the first support leg 233 toward the opposite side of the coupler 231. The first contact 234 is inclined downward such that one end 2341 of the first contact 234 is located further away from the circuit board 121 than an end 1331a of the first support leg 133a. Under the above-mentioned shape, the circuit board 121 is pressed by a press jig, and when the first contact 234 makes contact with the cap plate 115 of the bare cell 110, it is bent such that its entire surface is attached as illustrated by a dotted line. The first contact 234 is coupled to the cap plate 115 of the bare cell 110, for example, by laser welding.

The second support 235 includes a second support leg 236 and a second contact 237. The second support leg 236 extends from one end 2312 of the coupler 231 located on the lengthwise outer side of the circuit board 121 toward the cap plate 115 of the bare cell 110. The second support leg 236 is a substantially flat plate and is bent from the coupler 231. The second contact 237 is formed at an end of the second support leg 236. The second contact 237 makes contact with the cap plate 115 of the bare cell 110. Since the second support 235 is located on the lengthwise inner side of the circuit board 121 than the first support 232, the circuit board 121 is effectively prevented from bent due to a bending moment applied to the circuit board 121.

FIG. 7 is a flowchart illustrating a manufacturing method for a secondary battery including a protection circuit module according to an embodiment of the present invention. Referring to FIG. 8, the manufacturing method for a protection circuit module includes the steps of preparing a bare cell and a protection circuit module (S10), pressing a circuit board by a press jig (S20), and performing welding (S30).

First, in the step of preparing the bare cell and the protection circuit module (S10), the bare cell 110 and the protection circuit module 120 are prepared. The structures of the bare cell 110 and the protection circuit module 120 are as mentioned above, in which case a detailed description thereof will not be repeated.

Next, in the step of pressing the circuit board by a press jig (S20), the circuit board 121 is pressed using the press jig 170 illustrated in FIG. 8. First, the structure of the press jig 170 will be described. Referring to FIG. 8, the press jig 170 includes a first press 171, a second press 172, and a connector connecting the two presses 171 and 172. The first press 171 and the second press 172 protrudes in the pressing direction further than the connector 173. The first press 171 and the second press 172 located in correspondence to the first coupling member 130a and the second coupling member 130b of the protection circuit module 120.

Now, the step of pressing the circuit board using the press jig 170 (S20) will be described in detail. As illustrated in FIG. 8, the protection circuit module 120 is located such that the first and second contacts 134a and 137a of the first coupling member 130a and the first and second contacts 134b and 137b of the second coupling member 130b are positioned on the cap plate 115 of the bare cell 110. In this state, the circuit board 121 of the protection circuit module 120 is pressed toward the bare cell 110 by the press jig 170. Then, the two presses 171 and 172 of the press jig 170 make contact with opposite lengthwise ends of the circuit board 121. The connector 173 of the press jig 170 is spaced apart from the circuit board 121. Consequently, the pressing force is applied only to opposite ends of the circuit board 121, minimizing the bending moment applied to the circuit board 121. The circuit board 121 is prevented from being bent (deflection of a lengthwise central portion of the circuit board) by the second support 135a of the first coupling member 130a and the second support 135b of the second coupling member 130b located on the lengthwise inner side of the circuit board 121. Then, the first coupling member 130a and the second coupling member 130b are bent and deformed, attaching the entire surface of the two contacts 134a and 137a of the first coupling member 130a and the entire surfaces of the two contacts 134b and 137b of the second coupling member 130b to the cap plate 115 of the bare cell 110. The second lead plate 122c of the PTC device 122 is located on the electrode terminal 116 of the bare cell 110.

Next, the step of performing welding (S30) is carried out by welding the first coupling member 130a and the second coupling member 130b of the protection circuit module 120. In more detail, the first contact 134a of the first coupling member 130a and the first contact 134b of the second coupling member 130b are laser-welded, with the circuit board 121 being pressed by the press jig 170, to couple the protection circuit module 120 to the bare cell 110.

Thereafter, the coupling of the protection circuit module 120 and the bare cell 110 is completed by removing the press jig 170 and welding the second lead plate 122c of the PTC device 122 to electrically connect the second lead plate 122c to the electrode terminal 116 of the bare cell 110.

Although the embodiments of the present invention have been described in detail hereinabove, it should be understood that many variations and modifications of the basic inventive concept herein described will still fall within the spirit and scope of the present invention as defined in the appended claims.

What is claimed is:

1. A secondary battery having a protection circuit module, the secondary battery comprising:
    a bare cell including a can and a cap plate sealing the can; and
    a protection circuit module including a circuit board and a coupling member positioned at least one side in the longitudinal direction of the circuit board to couple the circuit board to the cap plate, and the coupling member directly connected to the cap plate;
    wherein the coupling member comprises:
        a coupler having a first and a second end fixed to the circuit board; and
        first and second supports respectively extending from the first and second ends of the coupler and spaced apart from each other in the longitudinal direction of the circuit board,
        wherein the first support of the coupling member further comprises a first contact contacting the bare cell and a first support leg connecting the coupler to the first contact;
        wherein the second support further comprises a second contact contacting the bare cell and a second support leg connecting the coupler to the second contact wherein the first contact extends longitudinally outward from underneath the protection circuit module.

2. The secondary battery of claim 1, wherein the coupling member comprises two coupling members which are respectively provided at both sides in the longitudinal direction of the circuit board.

3. The secondary battery of claim 2, wherein the two coupling members are positioned at both ends in the longitudinal direction of the circuit board.

4. The secondary battery of claim 2, wherein at least one of the two coupling members is made of electrically conductive material.

5. The secondary battery of claim 1, wherein the first contact is positioned towards the outside in the longitudinal direction than the second contact.

6. The secondary battery of claim 5, wherein the first contact of the first support of the coupling member is coupled to the bare cell by welding.

7. The secondary battery of claim 6, wherein the welding comprises laser welding.

8. The secondary battery of claim 5, wherein the first contact comprises a plate connected to the first support leg.

9. The secondary battery of claim 5, wherein the second contact comprises a plate connected to the second support leg.

10. The secondary battery of claim 5, wherein the second contact is formed at an end of the second support leg.

11. The secondary battery of claim 1, wherein the coupling member is integrally made by bending a plate member.

* * * * *